(12) United States Patent
Graham et al.

(10) Patent No.: US 10,578,235 B2
(45) Date of Patent: Mar. 3, 2020

(54) TUBE COUPLING

(71) Applicant: Reliance Worldwide Corporation (Aust.) Pty. Ltd., Melbourne, Victoria (AU)

(72) Inventors: Peter Graham, Evesham (GB); Jeremy Gledhill, Moorabin (AU)

(73) Assignee: RELIANCE WORLDWIDE CORPORATION (AUST.) PTY. LTD., Melbourne (AU)

( * ) Notice: Subject to any disclaimer, the term of this patent is extended or adjusted under 35 U.S.C. 154(b) by 416 days.

(21) Appl. No.: 14/777,207

(22) PCT Filed: Mar. 26, 2014

(86) PCT No.: PCT/AU2014/000322
§ 371 (c)(1),
(2) Date: Sep. 15, 2015

(87) PCT Pub. No.: WO2014/153608
PCT Pub. Date: Oct. 2, 2014

(65) Prior Publication Data
US 2016/0033065 A1    Feb. 4, 2016

(30) Foreign Application Priority Data
Mar. 26, 2013    (AU) ................................ 2013901033

(51) Int. Cl.
*F16L 25/01*    (2006.01)
*F16L 37/091*    (2006.01)

(52) U.S. Cl.
CPC .............. *F16L 25/01* (2013.01); *F16L 37/091* (2013.01)

(58) Field of Classification Search
CPC ..... F16L 25/01; F16L 37/0915; F16L 37/091; F16L 37/0925; F16L 37/12
See application file for complete search history.

(56) References Cited

U.S. PATENT DOCUMENTS

| 3,743,326 A | 7/1973 | Courtot et al. |
| 3,837,687 A | 9/1974 | Leonard |

(Continued)

FOREIGN PATENT DOCUMENTS

| EP | 0785386 A1 * | 7/1997 | .............. F16L 21/08 |
| EP | 0897082 A1 | 2/1999 | |

(Continued)

OTHER PUBLICATIONS

International Search Report issued in PCT/AU2014/000322 dated Sep. 3, 2014, 3 pages.

*Primary Examiner* — David Bochna
*Assistant Examiner* — James A Linford
(74) *Attorney, Agent, or Firm* — Bush Intellectual Property Law; Kenneth M. Bush

(57) ABSTRACT

A tube coupling (10) which includes a tubular, electrically conductive housing (11), a seal (12) for sealing against the outside of a tube, a substantially annular and electrically conductive grab ring (13) for gripping the outside of a tube and an annular cartridge ring (15) between an inner surface of the housing (11) and the grab ring (13). The cartridge ring (15) includes a projection (30) that projects radially inwardly and is positioned so that upon insertion of a tube into the tube coupling (10), an edge of the grab ring (13) bears against the projection (30) and the cartridge (15) bears against a facing surface of the housing (11) to provide electrically continuity between the grab ring (13) and the housing (11).

20 Claims, 2 Drawing Sheets

(56) References Cited

U.S. PATENT DOCUMENTS

| | | | |
|---|---|---|---|
| 4,123,090 A * | 10/1978 | Kotsakis | F16L 37/0915 |
| | | | 285/340 |
| 4,386,796 A | 6/1983 | Lyall et al. | |
| 4,422,673 A | 12/1983 | Blackford et al. | |
| 4,632,437 A | 12/1986 | Robson et al. | |
| 4,664,427 A | 5/1987 | Johnston | |
| 4,807,911 A | 2/1989 | Short | |
| 5,046,763 A | 9/1991 | Martucci et al. | |
| 5,160,179 A | 11/1992 | Takagi | |
| 5,419,594 A | 5/1995 | Nelms | |
| 5,474,336 A | 12/1995 | Hoff et al. | |
| 5,511,830 A | 4/1996 | Olson et al. | |
| 5,584,513 A | 12/1996 | Sweeny et al. | |
| 5,673,945 A | 10/1997 | Olson | |
| 5,681,061 A | 10/1997 | Olson | |
| 5,692,785 A | 12/1997 | Wartluft et al. | |
| 5,791,698 A | 8/1998 | Wartluft et al. | |
| 5,921,588 A | 7/1999 | Vogel et al. | |
| 5,947,532 A | 9/1999 | Lorenz | |
| 5,975,587 A | 11/1999 | Wood et al. | |
| 6,039,361 A | 3/2000 | Meli | |
| 6,050,613 A | 4/2000 | Wartluft | |
| 6,065,779 A | 5/2000 | Moner et al. | |
| 6,155,607 A | 12/2000 | Hewitt et al. | |
| 6,349,978 B1 | 2/2002 | McFarland et al. | |
| 6,371,531 B1 | 4/2002 | Robison | |
| 6,378,915 B1 | 4/2002 | Katz | |
| 6,511,099 B2 | 1/2003 | Bartholoma et al. | |
| 6,773,039 B2 | 8/2004 | Muenster et al. | |
| 6,824,172 B1 | 11/2004 | Komolrochanapom | |
| 7,032,932 B2 | 4/2006 | Guest | |
| 7,338,030 B2 | 3/2008 | Brown, III | |
| 7,354,079 B2 | 4/2008 | Rehder et al. | |
| 7,425,022 B2 | 9/2008 | Guest | |
| 7,455,328 B2 | 11/2008 | Chelchowski et al. | |
| 7,469,936 B2 | 12/2008 | Norman | |
| 7,530,606 B1 | 5/2009 | Yang | |
| 7,543,858 B1 | 6/2009 | Wang | |
| 7,644,955 B1 | 1/2010 | Komolrochanapom | |
| 7,686,346 B1 | 3/2010 | Buccicone et al. | |
| 7,850,208 B2 | 12/2010 | Greenberger | |
| 7,866,710 B2 | 1/2011 | Sheppard et al. | |
| 8,052,177 B2 | 11/2011 | Irwin | |
| 8,205,915 B1 | 6/2012 | Crompton et al. | |
| 8,210,576 B2 | 7/2012 | Crompton | |
| 8,322,755 B2 | 12/2012 | Kluss et al. | |
| D676,940 S | 2/2013 | Kluss et al. | |
| D676,941 S | 2/2013 | Kluss et al. | |
| D676,942 S | 2/2013 | Kluss et al. | |
| D676,943 S | 2/2013 | Kluss et al. | |
| 8,444,325 B2 | 5/2013 | Guest | |
| 8,480,134 B2 | 7/2013 | Crompton et al. | |
| 8,789,853 B2 | 7/2014 | Gershkovich et al. | |
| 8,844,981 B1 | 9/2014 | Crompton et al. | |
| 9,228,681 B2 | 1/2016 | Kluss | |
| 9,746,114 B2 * | 8/2017 | Le Quere | F16L 37/0841 |
| 2005/0035597 A1 | 2/2005 | Bamberger et al. | |
| 2006/0108801 A1 | 5/2006 | Grosch | |
| 2008/0136166 A1 | 6/2008 | Guest | |
| 2009/0026758 A1 | 1/2009 | Sanzone | |
| 2009/0127803 A1 | 5/2009 | Chelchowski et al. | |
| 2010/0287740 A1 | 11/2010 | Rigollet et al. | |
| 2011/0025054 A1 | 2/2011 | Kluss | |
| 2011/0309614 A1 | 12/2011 | Guest | |
| 2012/0104749 A1 | 5/2012 | Kang | |
| 2012/0153617 A1 | 6/2012 | Kay | |
| 2013/0062877 A1 | 3/2013 | Hayashi et al. | |
| 2013/0069361 A1 | 3/2013 | Cai et al. | |
| 2013/0106103 A1 | 5/2013 | Horsfall et al. | |
| 2013/0147189 A1 | 6/2013 | Horsfall et al. | |
| 2013/0207385 A1 | 8/2013 | Williams et al. | |
| 2014/0062078 A1 | 3/2014 | Weissmann | |
| 2014/0152002 A1 | 6/2014 | Crompton et al. | |
| 2016/0018010 A1 | 1/2016 | Forrestal | |

FOREIGN PATENT DOCUMENTS

| | | |
|---|---|---|
| EP | 1172595 A | 1/2002 |
| EP | 2472160 A1 | 7/2012 |
| GB | 2380532 A | 4/2003 |
| WO | 2005114031 A2 | 12/2005 |
| WO | 2006065438 A1 | 6/2006 |

* cited by examiner

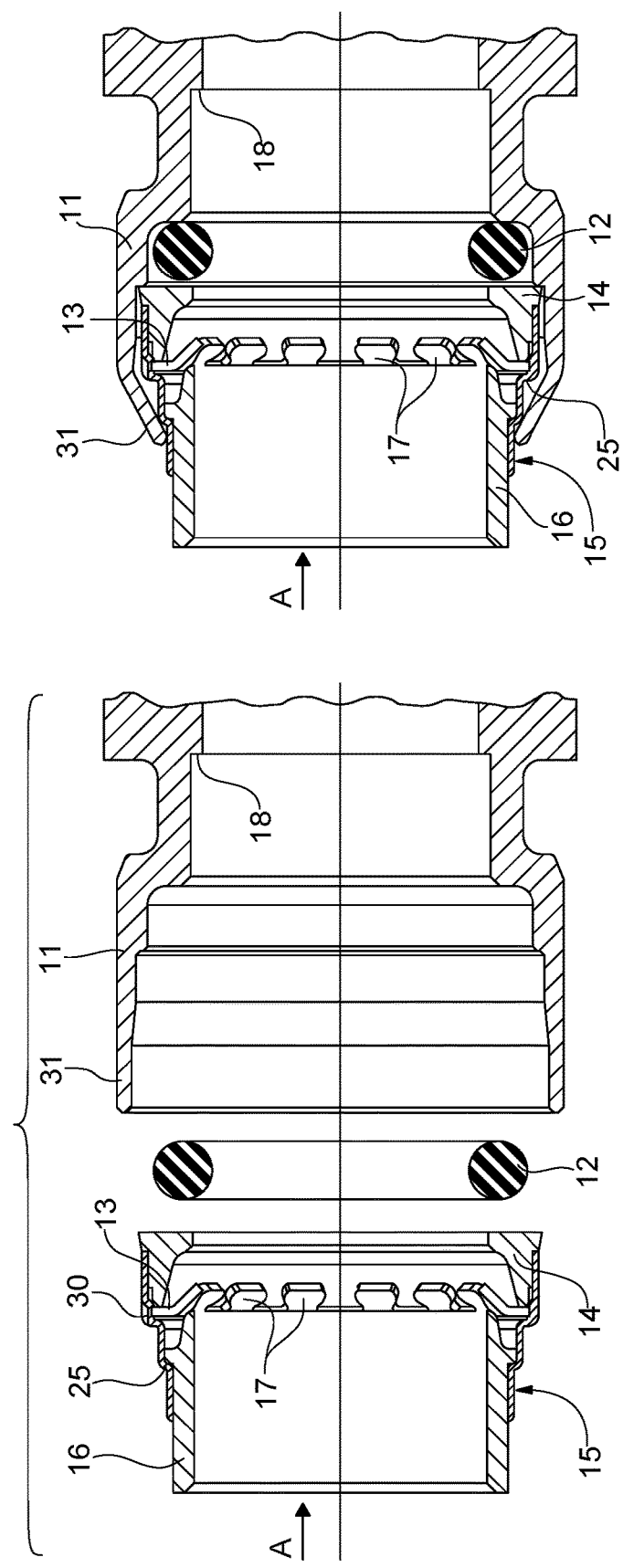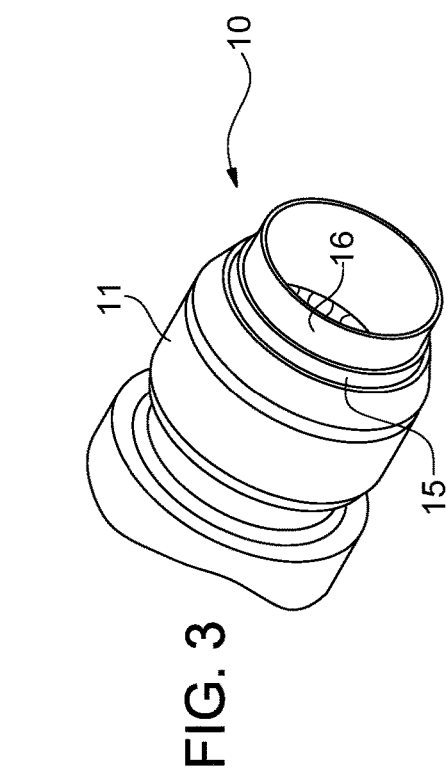

TUBE COUPLING

TECHNICAL FIELD

The present invention relates to a pipe or tube coupling (hereinafter a "tube coupling"), principally for use in plumbing installations with pipes, tubes or conduit (hereinafter collectively referred to as "tubes"), for connecting a pair of tubes together, more than a pair of tubes, such as for a tee fitting or a manifold, or for connecting a tube to an appliance or an accessory. It is to be noted however that the invention could have uses outside of the plumbing industry in other applications that require connection between tubes or between tubes and appliances or accessories.

The invention particularly relates to releasable push-fit tube couplings in which a tube can be pushed into the coupling and retained connected to the coupling by the internal fittings of the coupling and can be released by a suitable release mechanism.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

In many existing buildings, particularly older buildings, the plumbing of the building has been used for electrical earthing purposes. That is, the plumbing has been used to earth fittings of the building because the plumbing generally has an extensive and continuous path through the building that extends to earth and that is relatively accessible for earthing purposes. Moreover, in older buildings, the plumbing conduit or tubing is often copper which is electrically conductive. In these forms of plumbing installations, the tube couplings which are used to connect tubes or fittings together must also be electrically conductive so as not to disturb the earthing circuit. To achieve this, the tube coupling must include an internal conductive path which provides electrical continuity between the parts of the tube coupling that engage the tubes or fittings and between the housing of the tube coupling which typically will be brass and which typically forms a bridge between tubes and/or fittings for electrical flow.

Prior art tube couplings that provide electrical continuity exist. For example, British patent GB 2,380,532 provides an arrangement in which the circumferential edge of the grab ring of the tube coupling is formed to include one or more projections that are forced into engagement with the inside surface of the tube housing when a tube is inserted into the tube coupling. While this arrangement provides acceptable electrical contact between the grab ring and the housing, the projections as formed on the circumferential edge of the grab ring are not easy to produce because they are so small and these grab rings are either not used where electrical contact is not required or are used with a non-conductive cartridge ring. As such, the one form of grab ring is not universally appropriate for all forms of tube coupling.

Alternative arrangements have included a conductive cartridge ring, which is interposed between a metallic grab ring and the housing of the tube coupling, and which is made of machined brass. The grab ring is in contact with the cartridge ring at all times and the cartridge ring is in contact with the housing at all times so that upon contact between the grab ring and the outside of a tube that is inserted into the coupling, electrical continuity is ensured from the grab ring to the housing.

One problem with the above form of prior art, is that the use of brass for the cartridge ring adds expense to the cost of the tube coupling, not only because brass is more expensive than other metals, but also because a cartridge ring in brass requires the cartridge ring to be machined, which is an expensive form of manufacture. Another problem is that the tolerance between components of coupling must be close to ensure that contact between the grab ring, the cartridge and the housing is always maintained.

The present invention seeks to provide an alternative arrangement which provides one or more benefits over the prior art discussed above.

SUMMARY OF INVENTION

According to the present invention there is provided a tube coupling, including a tubular, electrically conductive housing, a seal within the housing for sealing against the outside surface of a tube which is inserted into the coupling, a substantially annular and electrically conductive grab ring located within the housing for gripping the outside of a tube which is inserted into the coupling to retain the tube against release from the coupling, an annular cartridge ring interposed between an inner surface of the housing and the grab ring, the cartridge ring including a projection that projects radially inwardly and is positioned so that upon insertion of a tube into the tube coupling, an edge of the grab ring bears against the projection and the cartridge ring bears against a facing surface of the housing to provide electrical continuity between the grab ring and the housing.

A tube coupling according to the invention advantageously can be arranged to ensure electrical continuity between a tube which is inserted into the tube coupling and the housing of the coupling by electrical connection through the grab ring and cartridge ring. While prior art arrangements also achieve this, the present invention can achieve this without the high tolerances required in the prior art. In addition, the present invention does not require the grab ring to include a projection and thus the disadvantages discussed above in relation to the provision of grab ring projections are not introduced. Moreover, the use of a projection in the cartridge ring does not render that cartridge ring unusable for tube couplings which are not required to provide electrical continuity, so that the same cartridge ring can be used regardless of the requirement for electrical continuity.

A cartridge ring according to the invention can be formed from any suitable electrically conductive material. The cartridge ring can for example, be formed of steel, brass or copper. Mild steel can be used and for corrosion resistance, it can be plated. Stainless steel is particularly preferred.

Alternatively, the cartridge ring can be formed from a plastic coated with a conductive material, e.g. chrome plating or vacuum metal plating. Still alternatively, the cartridge ring can be formed from an electrically conductive plastic. Other forms of cartridge ring could also be formed and are within the scope of the present invention.

In the preferred form of the invention, the cartridge ring is formed of plate or sheet metal and is stamped into shape. This form of cartridge ring can be manufactured for a lower cost than a machined brass cartridge ring for example, so that a tube coupling according to the invention can provide adequate electrical continuity, but at a reduced manufacturing cost compared to the prior art.

The cartridge ring can be stamped from any appropriate form of sheet metal. Suitable metals include metals such as stainless steel, plated mild steel, brass or copper. Stainless steel is particularly preferred for its ease in stamping, its conductivity, its cost and its corrosion resistance.

A cartridge ring according to the invention can include at least two annular sections of different diameter that are connected by an annular step. The annular step which is interposed between the at least two annular sections of different diameter, can be a radial or approximately radial step. The advantage of this arrangement is that the cartridge ring can be used to assemble components of the tube coupling before they are inserted into the housing of the tube coupling. For example, in one form of the invention, the cartridge ring includes three annular sections of different, but progressively larger diameter which are connected by two annular steps. In this form of the invention, each of the demount ring, the grab ring and the protection ring are positioned within the cartridge ring prior to insertion into the housing. The demount ring bears against one of the annular steps, the grab ring bears against the second of the annular steps and the protection ring bears against one end of the largest diameter annular section. This arrangement assists assembly of these components for insertion into the housing of the tube coupling and can assist to maintain those components to be properly located within the tube coupling. The use of annular sections connected by one or more annular can steps can also improve the structural strength of the cartridge ring.

The projection that projects radially inwardly can be formed in either of the annular sections, such as the section of greater diameter and the projection can be formed anywhere within any of the annular sections, such as adjacent the annular step. In some forms of the invention, the projection is formed as part of the annular section of greater diameter and as part of the annular step.

Alternatively, the projection can be formed within one of the annular sections, spaced from the annular step between them.

As indicated above, in some forms of the invention, the cartridge ring includes three annular sections. The three annular sections can be of different diameter to each other, for example with the smallest diameter section forming one axial end of the cartridge ring, and the largest diameter section forming the other axial end of the cartridge ring, so that the intermediate annular section is of a diameter between the smallest and largest sections. Other configurations are possible such as the intermediate annular section being of the greatest diameter and the other two annular sections being of lesser but equal diameter or different diameter. Each of the annular sections can be connected by an annular step which extends radially or approximately radially. In that form of the invention, a projection can be formed in either of the annular steps and in any of the annular sections. The form of the cartridge ring can be selected to assist the location components of the tube coupling and to ensure proper electrical contact with the grab ring and the housing.

In some forms of the invention, only a single projection is formed in the cartridge ring. As will be described later herein, a single projection can ensure firm contact between the cartridge ring and the grab ring. In that form of the invention, the grab ring can rest slightly off-centre relative to both the axis of the housing and the cartridge ring before a tube is inserted into the tube coupling. When a tube is inserted into the tube coupling, the grab ring is brought into substantial alignment with the axis of the housing and the cartridge ring and that brings the grab ring into firm contact with the projection of the cartridge ring.

However, in other forms of the invention, two or more projections are provided. For example, a pair of projections can be provided and those projections might be provided in the same quadrant of the cartridge ring, or in diametrically opposed positions of the ring, or elsewhere as deemed appropriate.

Alternatively, three projections might be provided and in those forms of the invention, the projections can be formed at any suitable position in the cartridge ring, such as equidistantly about the cartridge ring, so that they are spaced apart 120° to each other.

Any number of projections can be included and for example, a section of the cartridge ring could include a plurality of projections, such as six or more projections. Alternatively, one or two projections that extend through an arc that has the same dimension of the plurality of projections mentioned above could be provided. Thus, the number of projections, their size and their position can vary. While a single projection can provide electrical contact between the grab ring and the cartridge ring, a plurality of projections can provide improved electrical contact.

As indicated above, where more than a single projection is provided, and where the cartridge ring includes more than one annular section, the projections can be formed in the same annular section of the cartridge ring, although at a different location. For example, two projections could be provided in the same annular section, but spaced apart in that section. Alternatively, the projections can be formed in different annular sections and also through the annular step between the annular sections if appropriate. The provision of more than a single projection is easily accomplished in a cartridge ring that is stamped from sheet metal such as stainless steel.

Formation of the projection partially through an annular step between adjacent annular sections is advantageous to ensure that the edge of the grab ring engages the projection of the cartridge ring. In this form of the invention, the edge of the grab ring can bear axially against a facing surface of the annular step to position the grab ring and in that position the projection will be engaged. Alternative arrangements include forming a groove or recess in the projection into which the edge of the grab ring extends when a tube is inserted into the tube coupling. The edge of the grab ring might extend into the groove or recess prior to the tube being inserted into the tube coupling and be urged further into the groove or recess, or be urged into more firm engagement within the groove or recess when a tube is inserted into the tube coupling. Other arrangements could be adopted.

The extent to which a projection is required to project radially inwardly, is dependent on the distance to be bridged between the grab ring and the inside surface of the housing to which electrical contact is to be made. The expectation is that the extent of the projection is not required to be great, and can be in the order of less than 1 mm. For electrical continuity, when a tube has been inserted into the tube coupling, the grab ring should be in constant contact with projection and the cartridge ring should be in constant contact with the inside surface of the housing. The provision of a projection of this size is suitable to form by stamping of sheet metal.

As indicated above, in some forms of the invention, contact between the grab ring and the projection, prior to insertion of a tube into the tube coupling, will cause the grab ring to be slightly off-centre relative to the axis of the coupling. However, when a tube is inserted into the coupling, the grab ring will be forced into a central position within the coupling, aligned with the axis of the coupling, and advantageously, the edge of the grab ring will be forced into firm contact with the projection. Further, by that movement of the grab ring, the cartridge ring will advantageously, be forced into firm contact with the housing and by that arrangement, electrical continuity between a tube and the tube coupling housing is ensured. It will be understood that creation of the off-centre grab ring as described above can (but not always) requires that a single projection is employed, or if more than one projection is employed that those projections are not equidistantly spaced apart. For example, a pair of projections could be employed and still create the off-centre grab ring, but the projections would need to be located within 180° of each other. Likewise, three or more projections could be employed, again, as long as they are within a 180° section or arc of the cartridge ring.

Either or both of the grab ring and the cartridge ring can include a split to allow for radial expansion as a tube is inserted into the tube coupling and as the grab ring engages the projection of the cartridge ring. A split in the grab ring allows the grab ring to expand to engage the projection of the cartridge ring, while a split in the cartridge ring allows the cartridge ring to expand into firm contact with the housing.

Where a cartridge ring is formed to have more than one annular section, a projection could be provided that extends into each of the annular sections of the cartridge ring, so that the projection has an extent axially of the tube coupling that bridges between two annular sections and therefore bridges across the annular step between the annular sections. Where a cartridge ring includes more than two annular sections and annular steps, the projection can bridge across as many annular sections as required. The or each projection can have any suitable arcuate or circumferential extent.

Alternatively, a plurality of projections can be provided by employing one or more projections in one of the annular sections and one or more projections in another of the annular sections. Thus, in a cartridge ring that includes three annular sections, projections can be provided in one of those sections, two of the sections or all three sections. In each section, one or more projections can be provided and these can extend into the annular steps between the annular sections.

The flexibility of establishing a projection in a cartridge ring, in particular in an annular section of a cartridge ring, is a unique feature of the present invention. The inclusion of a projection in a cartridge ring is not known to applicant yet provides several advantages as described above. Moreover, by stamping the cartridge ring out of suitable metal, one or more projections can readily be provided at a reduced cost compared to production of a projection by different means. This differs from machining of cartridge rings, in which projections are far more difficult to provide.

BRIEF DESCRIPTION OF DRAWINGS

In order that the invention may be more fully understood, some embodiments will now be described with reference to the figures in which:

FIG. 1 is a cross-sectional exploded view of an end portion of a tube coupling according to the invention taken through A-A of FIG. 5.

FIG. 2 is a cross-sectional assembled view of the tube coupling of FIG. 1.

FIG. 3 is a perspective view of an end portion of the tube coupling of FIG. 1.

DETAILED DESCRIPTION

Figure 4:
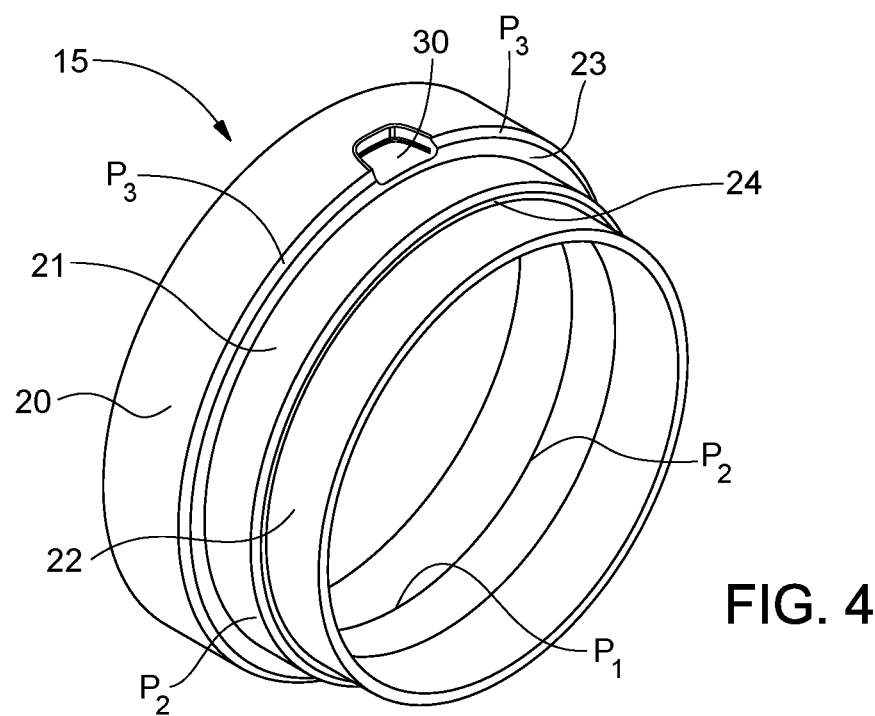
FIG. 4 is a perspective view of a cartridge ring for use in the tube coupling of FIG. 1.

FIGS. 1 and 2 are cross-sectional exploded and assembled views of an end portion of a tube coupling according to the invention respectively. FIG. 3 is a perspective view of the assembled tube coupling of FIG. 2. Thus, FIGS. 1 to 3 illustrate a tube coupling 10 that includes a housing 11, a seal 12 and a grab ring 13. A protection ring 14 is interposed between the seal 12 and the grab ring 13 to maintain spacing between the seal 12 and the grab ring 13 so that the seal 12 does not come into contact with the teeth 17 of the grab ring 13, which might otherwise damage the seal 12.

A cartridge ring 15 extends about the radial periphery of the grab ring and the protection ring 14. A demount ring 16 extends into the cartridge ring 15 proximate the teeth 17 of the grab ring 13, and is operable upon axial movement into the tube coupling 10 to engage the teeth 17 to bend them radially outwardly so as to allow withdrawal of a tube that has been inserted into the tube coupling 10 and gripped by the grab ring 13. Thus, the demount ring 16 is moveable axially from the position illustrated in FIGS. 1 and 2 in the direction A to engage the grab ring teeth 17.

The housing 11 shown in FIG. 1 differs from that of FIG. 2 by the entry end 31 having been rolled over to engage the cartridge ring 15 against release. Thus, once all of the components of the tube coupling 10 have been assembled, the entry end 31 is rolled to the position shown in FIG. 2 and assembly of the tube coupling 10 is complete.

In the illustrated embodiment, the end of the coupling 10 opposite to the demount ring 16 is shown incomplete. That opposite end could be the same as the illustrated end so that the coupling 10 is symmetrical about the centre of the coupling for example, or it could be asymmetrical and include a different form of connection at the opposite end, or it could connect to or be part of an appliance or an accessory to which a tube is to be connected. For example, the opposite end could be a part of a water heater or an air conditioner to which a supply tube is to be releasably connected.

A person skilled in the art will understand that the tube coupling 10 can accept insertion of a tube (not shown) through the demount ring 16, past the teeth 17 of the grab ring 13, past the protection ring 14 and the seal 12 to the point at which the end of the tube abuts against the internal abutment 18. Once the end of the tube reaches the abutment 18, the tube is fully inserted and the teeth 17 grip against the outside surface of the tube and prevent its release. The seal 12 seals against the outside surface of the tube.

To release the tube from the tube coupling 10, the demount ring 16 is pushed in the direction A to engage the teeth 17 and to disengage them from gripping the outside surface of the tube. With the demount ring 16 shifted into that disengagement position, the tube can be released.

As explained above, certain installations require electrical continuity between a tube which has been inserted into the tube coupling 10 and the housing 11. The present invention as illustrated, provides for electrical continuity by forming the cartridge ring 15 from a stamped sheet metal and including a projection in the cartridge ring 15 which is engaged by the grab ring 13 upon insertion of a tube into the coupling 10. The cartridge ring 15 is also arranged to be in contact with the housing 11, so that electrical continuity between a tube which has been inserted into the tube coupling 10 and the housing 11 is assured.

Figure 5:
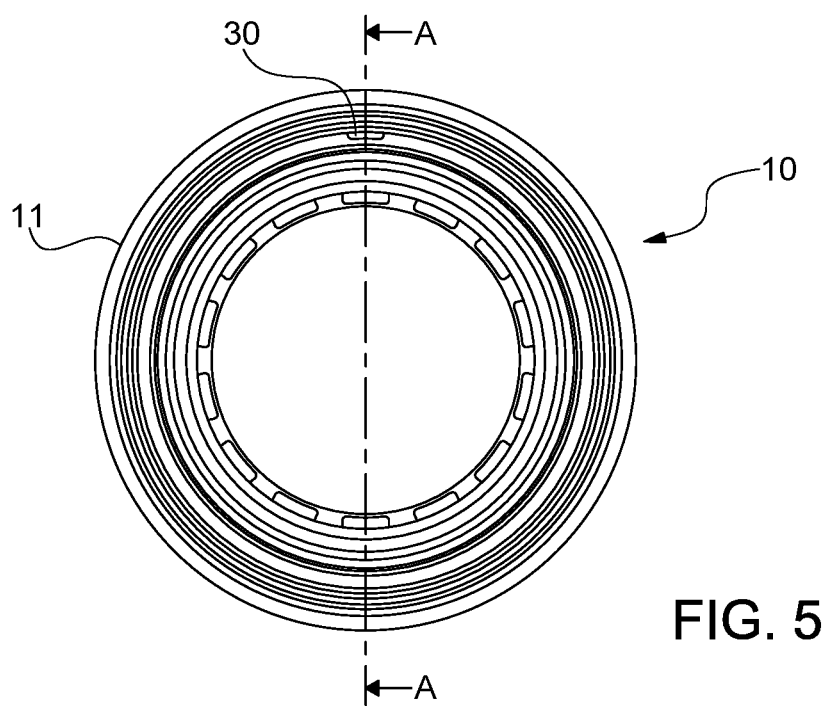
FIG. 5 is an end view of the tube coupling of FIG. 1.

While the projection 30 is evident in FIGS. 1 and 2, it is more prominently illustrated in FIGS. 4 and 5. With reference to FIG. 4, the cartridge ring 15 includes three annular sections of different diameter 20, 21 and 22. Annular steps 23 and 24 connect between the annular sections 20 and 21, and 21 and 22 respectively. As is evident from FIG. 4, annular section 20 has the greatest diameter, followed by annular section 21 and annular section 22. The radial dimension of the annular step 23 is slightly greater than the same dimension of the annular step 24.

The cartridge ring 15 is configured for use in the tube coupling 10, and could take a variety of different forms in tube couplings of different type or dimension. The cartridge ring 15 advantageously assists assembly of the tube coupling 10, as the cartridge ring 15 allows each of the grab ring 13, the protection ring 14 and the demount ring 16 to be assembled together as shown in FIG. 1 for insertion into the housing 11 to form the assembly of FIG. 2. As shown in FIGS. 1 and 2, the demount ring 16 includes a raised annular flange 25 shown in FIGS. 1 and 2, the demount ring 16 includes a raised annular flange 25 which is configured to rest against the annular step 24 of the cartridge ring 15 in an assembled condition. By that arrangement, the annular ring 16 is prevented from release from the tube coupling 10 when fully assembled as in FIG. 2. Thus, with reference also to FIG. 4, the annular section 22 of the cartridge ring 15 sits against the outside surface of the demount ring 16, the flange 25 rests against the annular step 24 and the grab ring 13 rests against the annular step 23. Finally, the protection ring 14 is partly accommodated within the annular section 20.

For a tube that is inserted into the tube coupling 10, the teeth 17 of the grab ring 13 engage the outside surface of the tube and electrical continuity can be provided through electrical connection between the grab ring 13 and the housing 11 via the cartridge ring 15. While electrical continuity might occur naturally through engagement between the grab ring 13, the cartridge 15 and the housing 11, the present invention ensures that continuity, by the provision of one or more projections formed in the cartridge ring 15 that extend radially inwardly, for engagement with the grab ring 13.

FIG. 4 illustrates a single projection 30 which is formed partly within the annular section 20 and partly through the annular step 23. The projection 30 is shown from outside the cartridge ring 15 in FIG. 4, while in FIG. 5, the projection 30 is shown from the inside of the cartridge ring 15. The depth of the projection 30 means that in the assembled form of the tube coupling 10 of FIG. 2 (without a tube inserted into the tube coupling 10), the outer peripheral edge of the grab ring 13 engages the projection 30 lightly. That engagement tends to position the grab ring 13 slightly off-centre to the central axis of the tube coupling 10. However, when a tube is inserted into the tube coupling 10, engagement of the teeth 17 of the grab ring 13 with the outside of the tube tends to force the grab ring 13 to a centred position aligned on the axis of the tube coupling 10 and that tends to force the peripheral edge of the grab ring 13 into firm electrical contact with the projection 30. Moreover, the cartridge ring 15 is pressed into firm electrical contact with the inside and facing surfaces of the housing 11, such as at the entry end 31 of the housing 11, so that permanent and secure electrical connection is maintained between a tube which has been inserted into the coupling 10 and the housing 11.

As explained earlier, while only a single projection is shown in the figures, additional projections can be provided, such as at the same general position as shown in FIG. 4 but spaced circumferentially away from the illustrated projection 30, or through one or more of the annular sections 21 and 22 and the steps 23 and 24. Instead of forming the projection 30 partially through the step 23, the projection could be formed fully within the annular section 20 or any other of the sections 21 and 22, or the projection 30 could extend from the position shown and into the annular section 21 and/or the annular section 22.

FIG. 4 shows example potential positions of further projections (without illustrating the projections), such as projection $P_1$ being diametrically opposed to the projection 30, projections $P_2$ being formed equidistantly about the cartridge ring 15 relative to the projection 30 and spaced apart 120° to each other, or two projections $P_3$ being located within 180° of each other.

The present invention not only provides for secure electrical continuity in a tube coupling 10 once a tube has been inserted, but it also provides electrical continuity in a manner which can be made more cheaply than in prior art arrangements. Moreover, the actual manufacturing process of a cartridge ring 15 in accordance with the invention is simplified compared to prior art arrangements, but the outcome remains at least as good a those arrangements and potentially better.

The invention described herein is susceptible to variations, modifications and/or additions other than those specifically described and it is to be understood that the invention includes all such variations, modifications and/or additions which fall within the spirit and scope of the present disclosure.

The claims defining the invention are as follows:

1. A tube coupling, including a tubular, electrically conductive housing, a seal within the housing for sealing against the outside of an electrically conductive tube which is inserted into the coupling, an annular and electrically conductive grab ring located within the housing for gripping the outside of the tube which is inserted into the coupling to retain the tube against release from the coupling, an annular and electrically conductive cartridge ring interposed between an inner surface of the housing and the grab ring, the cartridge ring including a non-annular electrically conductive projection that projects radially inwardly from an annular inner surface of the cartridge ring so that upon insertion of the tube into the tube coupling, an edge of the grab ring bears against the projection and the cartridge ring bears against a facing surface of the housing to provide electrical continuity between the grab ring and the housing through the projection and thereby ensure electrical continuity between the tube and the housing.

2. A tube coupling according to claim 1, the cartridge ring being stamped from stainless steel, mild steel, plated mild steel, brass or copper sheet metal.

3. A tube coupling according to claim 1, the cartridge ring having at least two annular sections of different diameter that are connected by an annular step which is interposed between the at least two annular sections of different diameter.

4. A tube coupling according to claim 3, the projection being formed in either of the annular sections.

5. A tube coupling according to claim 4, the projection being formed adjacent the annular step.

6. A tube coupling according to claim 4, the cartridge ring including three annular sections.

7. A tube coupling according to claim 6, the three annular sections being of different diameter to each other.

8. A tube coupling according to claim 7, the smallest diameter section forming one axial end of the cartridge ring, the largest diameter section forming the other axial end of the cartridge ring, and the section intermediate the smallest and largest annular sections being of a diameter between the smallest and largest sections.

9. A tube coupling according to claim 6, each of the annular sections being connected by an annular step which extends radially.

10. A tube coupling according to claim 9, the projection extending into either of the annular steps.

11. A tube coupling according to claim 3, the projection being formed as part of the annular section of greater diameter and as part of the annular step.

12. A tube coupling according to claim 3, the projection being formed within one of the two annular sections, spaced from the annular step.

13. A tube coupling according to claim 3, the projection having an axial extent that bridges between the two annular sections and the annular step between the annular sections.

14. A tube coupling according to claim 1, two or more projections being formed in the cartridge ring.

15. tube coupling according to claim 14, a pair of projections being provided in diametrically opposed positions of the ring.

16. A tube coupling according to claim 14, three projections being formed equidistantly about the cartridge ring, spaced apart 120° to each other.

17. A tube coupling according to claim 14, the projections being located within 180° of each other.

18. A tube coupling according to claim 1, the grab ring being slightly off-centre prior to a tube being inserted into the tube coupling by engagement with the projection.

19. A tube coupling for electrical grounding, comprising:
a) an electrically conductive housing for receiving an electrically conductive tube therein;
b) an annular and electrically conductive grab ring located within the housing for gripping an outside surface of the tube to reversibly secure the tube within the housing; and
c) an annular and electrically conductive cartridge ring interposed between an inner surface of the housing and the grab ring, the cartridge ring having at least two annular sections of different diameter that are connected by an annular step interposed between the at least two annular sections, the cartridge ring including a non-annular electrically conductive projection that projects radially inwardly less than 1 mm from an annular inner surface of the cartridge ring, the projection being formed as part of the annular step;
d) Wherein the projection is operable to continuously engage the grab ring and the cartridge ring is operable to continuously engage the housing when the tube is inserted within the grab ring and thereby ensure electrical continuity between the tube and the housing through the grab ring, the projection, and the cartridge ring when the tube is inserted within the grab ring.

20. A tube coupling for electrical grounding, comprising:
a) an electrically conductive housing for receiving an electrically conductive tube therein;
b) an annular and electrically conductive grab ring located within the housing for gripping an outside surface of the tube to reversibly secure the tube within the housing; and
c) an annular and electrically conductive cartridge ring interposed between an inner surface of the housing and the grab ring, the cartridge ring having at least two annular sections of different diameter that are connected by an annular step interposed between the at least two annular sections, the cartridge ring including a plurality of non-annular electrically conductive projections spaced circumferentially along an annular inner surface of the cartridge ring, each of the projections projecting radially inwardly less than 1 mm from the annular inner surface of the cartridge ring, each of the projections being formed as part of the annular step;
d) wherein the plurality of projections are operable to continuously engage the grab ring and the cartridge ring is operable to continuously engage the housing when the tube is inserted within the grab ring and thereby ensure electrical continuity between the tube and the housing through the grab ring, the projections, and the cartridge ring when the tube is inserted within the grab ring.

* * * * *